Fig. 2

EFFECT OF pH IN THE FIRST STAGE ON VISCOSITY OF 12-40-0 (1.0% CLAY) AFTER STORAGE FOR 30 DAYS AT 80°F.

Fig. 3

EFFECT OF RETENTION TIME IN THE FIRST STAGE ON INITIAL VISCOSITY OF PRODUCT (12-40-0, 1% CLAY)

Fig. 4

PRODUCTION OF AMMONIUM PHOSPHATE SUSPENSION FERTILIZERS BY A BATCH-SIMULTANEOUS AMMONIATION PROCESS

United States Patent Office 3,813,233
Patented May 28, 1974

3,813,233
PRODUCTION OF SUSPENSION FERTILIZERS FROM WET-PROCESS ORTHOPHOSPHORIC ACIDS
Lucian A. Kendrick, Jr., Florence, Ala., assignor to Tennessee Valley Authority
Continuation-in-part of application Ser. No. 284,155, Aug. 28, 1972, now Defensive Publication T912,015, dated July 24, 1973. This application Apr. 23, 1973, Ser. No. 353,576
Int. Cl. C05b 7/00
U.S. Cl. 71—34
11 Claims

ABSTRACT OF THE DISCLOSURE

A process for preparing concentrated, high-grade N—$P_2O_5$ (e.g. 12-40-0) and mixed N—$P_2O_5$—$K_2O$ (e.g. 14-14-14) suspension fertilizers with exceptionally satisfactory long-term storage properties from merchant-grade (50-54 percent $P_2O_5$) wet-process phosphoric acid or other impure phosphoric acids. The process involves ammoniation of the acid in two or more steps to reduce precipitation of amorphous materials derived from the impurities which have gel-like properties that destroy fluidity of the fertilizer products. Other factors important to successful operation of the process are pH, reaction temperature, and retention time in each step or stage.

---

This application is a continuation-in-part of my copending application Ser. No. 284,155, filed Aug. 28, 1972, now Defensive Publication T912,015, published July 24, 1973.

My invention relates to a new process for producing high-analysis suspension fertilizers from merchant-grade wet-process or other impure phosphoric acids and to the product resulting therefrom. More particularly, it relates to the production of orthophosphate suspension fertilizers that have high grade, low viscosity, small crystals, and very satisfactory long-term storage properties. Still more particularly, my invention relates to a novel method of producing orthophosphate suspension fertilizers which consists of ammoniating wet-process merchant-grade phosphoric acids in such a manner as to form a concentrated N—$P_2O_5$ suspension fertilizer without formation of the usually occurring amorphous or gelatinous precipitates. These precipitates or compounds containing iron, aluminum, magnesium, and other impurities present in the impure acids cause high viscosities and partial or complete nonpourability in fresh concentrated N—$P_2O_5$ suspensions and in N—$P_2O_5$—$K_2O$ suspensions prepared from them. Furthermore, these intolerable characteristics gain in intensity with both storage time and with storage temperature. However, in my product the precipitates are in a form that allows fluidity which in turn allows higher concentration of the product.

Heretofore, suspension fertilizers prepared by direct ammoniation of merchant-grade wet-process and other impure orthophosphoric acids were required to be low in grade to avoid high viscosities which destroy fluidity of the suspensions and make pumping, pouring, or distribution to the soil impractical or impossible. Suspension fertilizers with low analyses have a very distinct economic disadvantage as compared with higher analysis products because costs of handling, freight, storage, and application are higher per unit of plant nutrient.

The art of producing both liquid and suspension fertilizers is well known and well described in the literature. See, for examples U.S. Pats. 2,950,961, Striplin et al., Aug. 30, 1961; 3,015,552, Striplin et al., Jan. 2, 1962; 3,109,729, Slack et al., Nov. 5, 1963; 3,113,858, Slack et al., Dec. 10, 1963; 3,326,666, Walters, June 20, 1967; 3,096,170, Newsome, July 2, 1963; 3,234,004, Smith et al., Feb. 8, 1966; 3,148,970, Smith et al., Sept. 15, 1964; Ser. No. 130,488, Jones and Frazier, filed Apr. 1, 1971 and under allowance; T889,024, Jones and Frazier, Aug. 31, 1971; T900,026, Jones, July 25, 1972; 3,382,050, Getsinger, May 7, 1968; and 3,192,013, Young, June 29, 1965.

The most common method of producing both solution and suspension fertilizers containing nitrogen and phosphate is by ammoniation of phosphoric acids. In the early 1950's, electric-furnace orthophosphoric acid, which is relatively free of impurities, was ammoniated to form 8-24-0 grade liquid fertilizer. Subsequently, it was demonstrated that superphosphoric acid could be produced and used in preparing solutions of higher grades such as 10-34-0 and 11-37-0. Later, suspension fertilizers which contain crystals of fertilizer salts suspended in saturated solutions were developed, and higher grades of fluid fertilizers than were available in the prior art were prepared commercially. Nitrogen compounds, such as urea, ammonium nitrate, ammonium sulfate, or urea-ammonium nitrate solution, and potassium compounds, such as potassium chloride, sulfate, etc., were added to the ammoniated phosphoric acid solutions and suspensions to give mixed fluid fertilizers with various ratios and grades.

Fluid fertilizers being produced at the present time that have both high analyses and satisfactory long-term storage properties contain polyphosphates. These fertilizers, which are almost as high in grade as solid products, are made from superphosphoric acid which contains substantial amounts of pyro and more condensed species of polyphosphates, e.g., tripoly, etc., or from wet-process orthophosphoric acid with superphosphoric acid added to sequester to congeneric impurities. These suspension fertilizers display certain distinct advantages over dry mixes in that costs of handling and shipping are less, and distribution of the fertilizers or fertilizers containing pesticides is simplified with more even distribution to the soil beng obtained. However, raw material costs for fluid fertilizers containing polyphosphate have been relatively high, and fluids containing polyphosphates, in many instances, therefore have had difficulty competing, strictly on an economical basis, with solid fertilizers. Since wet-process merchant-grade phosphoric acid costs less per unit of $P_2O_5$ than superphosphoric acids, which contain polyphosphates that sequester impurities, or electric-furnace orthophosphoric acids, which contain little or no impurities, the use of merchant-grade acid in preparation of liquid and suspension fertilizers has often been attempted. However, the grades of the fluid fertilizers were lower because of numerous factors, including impurities which precipitate as amorphous compounds with gel-like characteristics when such acids were ammoniated. The gelatinous properties of the precipitated impurities often completely destroyed the fluidity of the high-grade products and made it necessary to dilute them with water to low grade at the time of production to prevent excessive thickening or gelation in pumps, pipelines, and storage tanks. Once the materials in the pumps, pipelines, valves, tanks, etc., attain semisolid condition, it is extremely difficult to restore the fluidity.

Of the various methods and means available to the industry for manufacturing liquid fertilizer solutions and/or suspensions from wet-process phosphoric acid and in consideration of all of the factors involved, such as costs of manufacturing, transportation, application to the soil, and characteristics of the fertilizers to store well, two routes from phosphate rock to such fluid fertilizers probably are the most economical of the many known processes.

One of the routes (1) is the use of the direct process (as in Getsinger '059, supra) using the heat of ammoniation to convert merchant-grade wet-process orthophosphoric acid to an ammonium polyphosphate melt or possibly solution or suspension in preference to using the indirect process (as in Young '013, supra) of separately concentrating the acid by application of heat, then to be followed by the later ammoniation thereof.

The other major route (2) (as in Striplin et al., '552, supra) followed at the present time is to start with merchant-grade wet-process phosphoric acid (about 54 percent $P_2O_5$) and ammoniate it under conditions referred to by both Young and Getsinger as prior art. Such ammoniation without polyphosphate yields a thick pasty semisolid normally characterized by properties which are undesirable and make it unwieldy to handle; or alternatively, a dilute, low-grade fluid is made. Since the ammoniated product becomes more viscous and more unwieldy with storage time and temperature, the problem is more serious because the gel-like product acts as a solid in valves, pipes, and storage tanks, etc. Drastic measures may be required for removal of the solid products because dilution with water is more difficult once the product has developed to the solid state. However, from the freshly ammoniated acid, a clear liquid grade (10-34-0) or a suspension grade (13-39-0, 1.5 percent clay) that will store satisfactorily for 90 days or longer at 100° F. may be prepared by adding an ammoniated superphosphoric acid material such as 12-40-0 or 11-37-0 in amounts to supply about 40 percent of the total phosphate as polyphosphate and then diluting with water to the proper grade. However, polyphosphate is a necessary and an essential ingredient of the high-grade fertilizer products. It is further noted that, by either procedure, addition of polyphosphate adds to the cost of the fertilizer.

My invention relating to production of satisfactory high-analysis suspension fertilizers from wet-process merchant-grade orthophosphoric acid without addition of polyphosphate opens up a third and a less expensive route for producing high quality suspension fertilizers than those routes now being practiced. I have found that when merchant-grade wet-process phosphoric acids are reacted with ammonia by the procedure that I have discovered, a product with equal or even better properties than those of suspensions containing polyphosphate unexpectedly resulted. The ammoniated orthophosphate products are fluid and free flowing with as high analysis and as low viscosity as those containing polyphosphate.

It is therefore the principal object of the present invention to produce concentrated suspension fertilizers by a simple economical process from low-cost materials without sacrifice in quality, versatility, or product grade. A further object is to produce high-analysis ammonium orthophosphate suspension fertilizers from impure wet-process merchant-grade phosphoric acids and ammonia without precipitating amorphous and gel-like substance that formerly compelled dilution of the suspension to much lower grade for obtaining properties that are satisfactory. A still further object is to prepare high-grade suspension fertilizers that can be stored under most or all normal storage conditions for indefinite periods of time without deterioration in quality, such as increases in viscosity, settling of crystals, or growth of crystals to large size.

I have now discovered a novel, economical procedure for producing high-grade ammonium orthophosphate suspension fertilizers with excellent properties from merchant-grade wet-process phosphoric acid and ammonia. The viscosities obtained with previous processes, that far exceed tolerable limits, are attributed to the impurities in the wet-process acid; high viscosities do not develop in suspensions of the same grade made from purified acids. The main embodiment of my process involves ammoniation of wet-process orthophosphoric acid by a continuous multistage procedure in certain proportions by stages at certain rates and temperatures which unexpectedly prevented formation of gel-like materials; instead, these materials precipitate in a crystalline form that does not impart a high viscosity to the fluid product. The process allows the production of a higher grade product with satisfactory fluidity because of the form of the impurity content.

The main embodiment of my process was developed in my earlier work and reported in my parent application, Ser. No. 284,155, filed Aug. 28, 1972. Subsequently, I have become aware of situations where fluid fertilizer manufacturers are already equipped with single-stage mixers and I have now developed my process so that these fluid fertilizer manufacturers who are already equipped with single-stage mixers can use my process in their equipment. In order to get away from the multistage equipment which works best, I have developed a single-stage batch-simultaneous procedure that may be used in almost any single-stage mixer and still produce suspension fertilizers that have properties about equal to those prepared by the main embodiment of my process.

One advantage of my invention is that proucts made by my process are less expensive than other similar grade products because my raw materials are only wet-process merchant-grade phosphoric acid, water, and ammonia; these are the lowest cost raw materials possible for making ammonium phosphate suspension products. Also, my products are higher in grade than similar products made from the same raw materials because other products must be diluted to low grade to prevent high viscosities that my process avoids. Another advantage is that my products have lower viscosities than products from previous processes with the same raw materials. Another advantage of my invention is that base ($N:P_2O_5$) products prepared by my new procedures can be stored under normal storage conditions for indefinite periods of time with no deterioration in quality, such as increases in viscosity, excessive growth of crystals, settling and packing of crystals, or other deleterious happenings that frequently occur in most suspensions of similar grades that are now being produced. Still another advantage of my invention is that it is a simple, straightforward, and inexpensive process. Still another advantage is that my products, ammonium phosphate suspensions, can be mixed with fertilizer salts of potassium and nitrogen to produce N—$P_2O_5$—$K_2O$ suspensions with various ratios and higher grade than have heretofore been possible from suspensions containing all of the phosphate from wet-process orthophosphoric acid.

Still further and more general objects and advantages of my invention will appear from the more detailed description set forth below, it being understood, however, that this more detailed description is given by way of illustration and explanation only and not by way of limitation since various changes therein may be made by those skilled in the art without departing from the true spirit and scope of my invention.

My invention, together with further objects and advantages thereof, will be better understood from a consideration of the following description taken in connection with the accompanying drawings in which.

Figure 1:
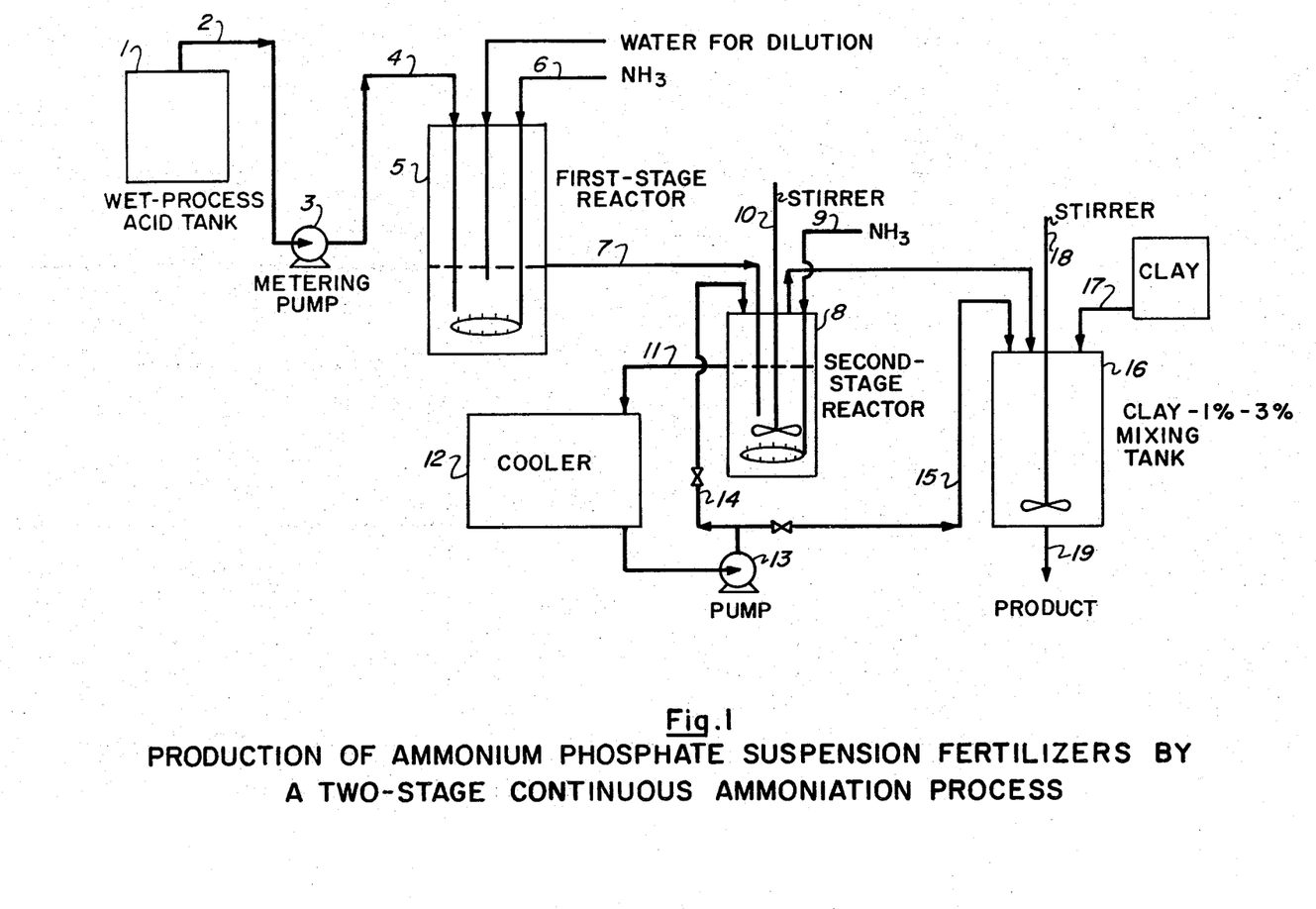
FIG. 1 is a flowsheet generally illustrating the principles of my novel multistage continuous-type process described more specifically infra as it is carried out in my first embodiment of my invention.

Referring now more specifically to FIG. 1, substantially all of the wet-process orthophosphoric acid employed is fed from tank 1 through pipeline 2 to metering pump 3 and on through line 4 to first-stage reactor 5. Ammonia gas is fed from a source not shown to first-stage reactor 5 through pipeline 6. Water for dilution also from a source not shown is introduced into first-stage reactor 5 as indicated. The ammonia is distributed at the bottom of first-stage reactor 5 through a sparger illustrated as located just below the wet-process orthophosphoric acid outlet. Ammonia—wet-process acid product from first-stage reactor 5 overflows through pipeline 7 into second-stage reactor 8. Ammonia gas is fed through pipeline 9 to second-stage reactor 8 and distributed through a sparger located at the bottom just below stirrer 10. Product from second-stage reactor 8 overflows through pipeline 11 to cooler 12. A portion of the cooled product is recirculated by pump 13 to second-stage reactor 8 through pipeline 14. Another portion is fed through pipeline 15 to clay mixing tank 16. Clay is fed from a source not shown through conveyor 17 to mixing tank 16. The resulting wet-process acid-ammonia product and clay are intimately mixed with stirrer 18 and the product suspension is discharged to storage through pipeline 19.

In carrying out the object of my invention, I have found that high-grade ammonium phosphate suspensions with excellent properties can be prepared by ammoniation of wet-process orthophosphoric acid. I have further found that with proper control, only two stages are necessary for producing high-grade suspensions that are entirely satisfactory in every respect. I have still further found that for my two-stage process to be most effective, the pH in the first stage should be in the range of about 2.0 to 5.5 with about pH 4.0 being preferred. I have also found that the retention time in the first stage may be varied over a wide range of 15 to 75 minutes; however, viscosity of the product suspension decreases as retention time increases, and the shortest time at which suspensions with acceptable viscosities could be consistently produced is about 30 minutes. The temperature in the first stage does not have great effect on viscosity of the product; however, boiling is preferred because a large part of the heat generated from the reaction is dissipated economically by the incidental evaporation of water. Also, operation at boiling is preferred due to the higher solubility of monoammonium phosphate at boiling as compared with lower temperatures. When there are large quantities of monoammonium phosphate crystals, they adhere to the walls of the reactor and stop up the pipeline leading from the first stage to the second-stage reactor. Therefore, boiling in the first stage is preferred. In the second stage, I have found that satisfactory suspensions can be prepared with pH in the range 5.4 to 6.4. However, at pH less than 5.8, the product contains monoammonium phosphate crystals that, because of their shape, cause higher viscosities than diammonium phosphate crystals, and the high solubility coefficient of monoammonium phosphate is conducive to crystal growth when the temperature decreases. Therefore, the preferred pH range in the second stage is between 5.8 and 6.4. Retention time in the second stage may be set for convenience; 10 minutes was usually used. Temperature of the second stage may be allowed to vary widely, 100°F. to boiling; however, 160° to 180° F. is preferred because ammonia losses are low at these temperatures, and effective and efficient evaporative-type cooling can be conducted at these same temperatures.

Figure 4:
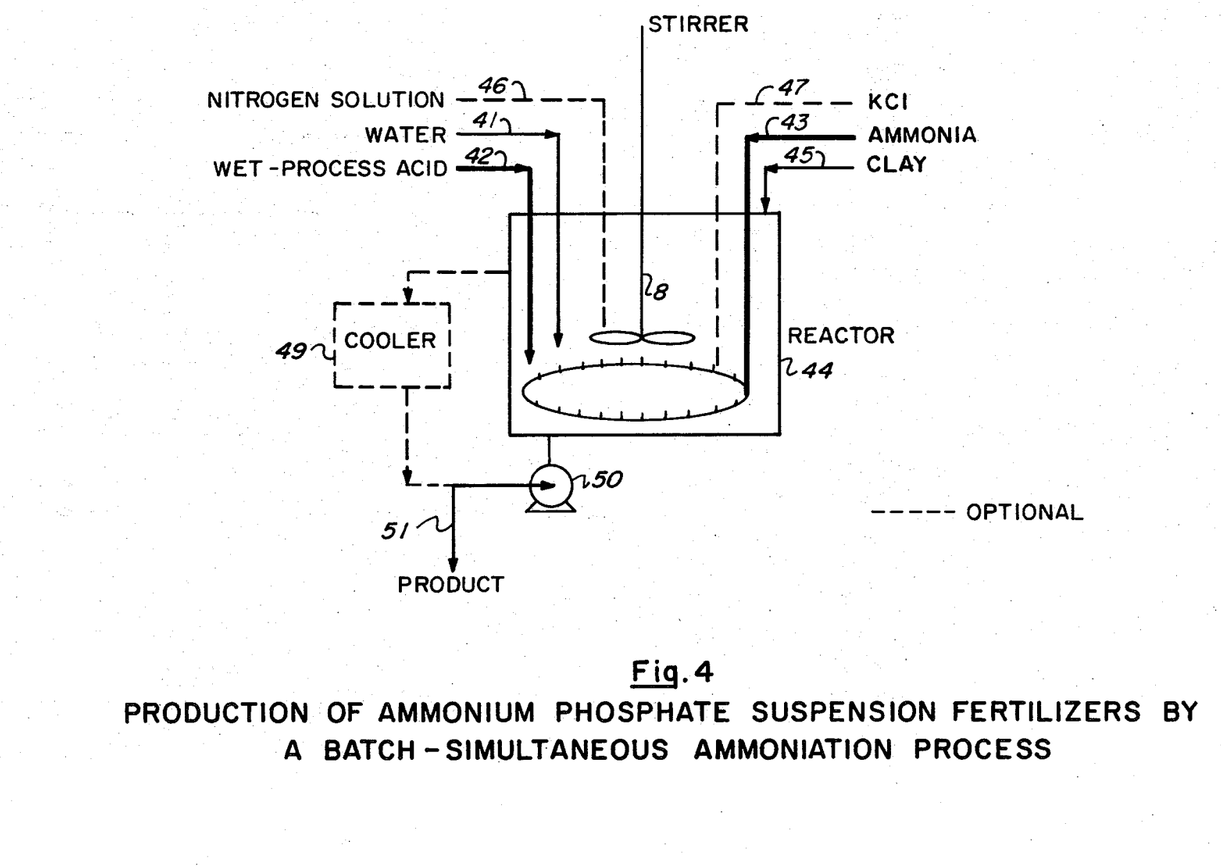
FIG. 4 is a flow sheet generally illustrating the principles of my novel process as it is carried out by a batch-simultaneous procedure in a single-stage mixer or reactor according to the second embodiment of my invention.

Referring now more specifically to FIG. 4, substantially all of the water required for producing the desired suspension grade is first fed through pipeline 41 to reactor 44. The wet-process orthophosphoric acid employed in the suspension is then fed from storage, not shown, through pipeline 42 to reactor 44 simultaneously with ammonia fed through pipeline 43 and distributed through a sparger located at the bottom just below stirrer 48 to maintain pH of 4.0. After all of the acid is fed, addition of ammonia is continued to raise the pH to 5.0. The reactor contents are then cooled from boiling (about 230° F.) to about 200° F. or less. When N—$P_2O_5$ suspensions are being prepared, the cooling is accomplished by recirculating the product with pump 50 through cooler 49 or by recirculating material to a storage tank not shown. When N—$P_2O_5$—$K_2O$ suspensions are being prepared the cooling may be accomplished by the above procedure or by adding KCl through conveyer 47 and/or nitrogen solution through pipeline 46 and intimately mixing with stirrer 48. Addition of ammonia is then continued through pipeline 43 to raise the pH to within the range of 5.9 to 6.4 and the suspending agent (clay) is added to the product through conveyer 45 and intimately mixed into the product with stirrer 48. The finished product is then discharged through line 51 to storage or to application equipment.

In order that those skilled in the art may better understand how the present invention may be practiced for production of high-grade suspensions with good storage properties, the following examples are given by way of illustration only and not by way of limitation. Example I illustrates differences in N—$P_2O_5$ suspensions prepared in the usual manner from wet-process orthophosphoric acid and ammonia and those prepared according to the main embodiment of my invention. Example II illustrates the differences in grade between N—$P_2O_5$—$K_2O$ suspensions prepared from wet-process orthophosphoric acid, ammonia, and other common fertilizer salts by the usual single-stage procedure and those prepared according to the main embodiment of my invention. Examples III through VIII define preferred conditions of pH, retention time, and temperature of the two ammoniation stages and of specific gravity of the product suspension according to the first and main embodiment of my invention. Examples IX through XII are of the second embodiment of my invention and Examples XIII and XIV are included to show clearly by cookbook type directions how high-grade suspension fertilizers with excellent properties may be prepared by my new, novel, and unique processes.

EXAMPLE I

Nitrogen-phosphate suspensions that were prepared by a two-stage, continuous ammoniation procedure operated under my preferred conditions are compared with similar suspensions prepared by a normal, single-stage procedure for ammoniation of wet-process orthophosphoric acid, e.g., the process set forth in TVA's 8th Demonstration booklet dated Oct. 6–7, 1970, page 4. In my two-stage procedure, the pH, retention time, and temperature in the first stage were 4.5, 30 minutes, and boiling (about 230° F.), respectively, and in the second stage the respective conditions were 5.9, 10 minutes, and 180° F. In the single-stage procedure, the pH, temperature, and retention time were 5.9, 180° F., and 30 minutes, respectively. All of the suspensions were prepared from merchant-grade wet-process phosphoric acid made from central Florida ore. A pH of 5.9 in the finished product from either process is preferred because that is the point wherein a product is obtained which closely approaches about maximum solubility of the ammonium orthophosphates and wherein substantially no crystals of monammonium phosphate are present, i.e., the suspended ammonium phosphate crystalline phase is substantially all diammonium phosphate.

The results in the table below show clearly that suspensions prepared by my procedure could be as high as 13–40–0 and still be completely satisfactory in every respect, whereas suspensions prepared by the normal single-stage procedure could be only as high as 10–30–0 and still have satisfactory properties; products with higher grades made by the single-stage process were too viscous and nonpourable.

Phosphate base suspensions made by ammoniating wet-process orthophosphoric acid from Florida Ore—comparison of a continuous two-stage process with the single-stage process

| Suspension grade [1] | Initial viscosity at 80° F., cp. | After storage for 90 days at 100° F. | |
|---|---|---|---|
| | | Viscosity at 80° F., cp. | Pourability, percent of total volume |
| Two-stage process of the instant invention: | | | |
| 13–40–0 | 630 | 630 | 100 |
| 12–40–0 | 580 | 500 | 100 |
| 12–39–0 | 500 | 380 | 100 |
| Single-stage process of the prior art type: | | | |
| 12–40–0 | 5,900 | >400,000 | 0 |
| 12–36–0 | 1,100 | >400,000 | 0 |
| 10–30–0 | 140 | 140 | 100 |

[1] Percent attapulgite clay

EXAMPLE II

Differences between highest acceptable grade of $N$—$P_2O_5$—$K_2O$ suspensions of various ratios prepared by the normal procedure from wet-process orthophosphoric acid, ammonia, and other fertilizer salts were compared with those prepared according to my invention. The $N$—$P_2O_5$—$K_2O$ suspensions shown in the following tabulation were prepared by mixing potassium chloride and supplemental nitrogen as urea-ammonium nitrate solution (32 percent N) with the satisfactory $N$—$P_2O_5$ suspensions shown in the table of Example I, supra; the 10–30–0 (1 percent clay) was made by the conventional procedure and the 12–40–0 (1 percent clay) made by my new method. No extra clay was added. The comparison of highest acceptable grade of $N$—$P_2O_5$—$K_2O$ suspensions prepared from wet-process orthophosphoric acid by a normal single-stage procedure with those prepared according to my invention is as follows:

From suspension grade 10–30–0 made by prior art procedures:
    4–12–24
    12–12–12
    5–15–15
    18–9–9
From suspension grade 12–40–0 made by my invention:
    5–15–30
    15–15–15
    7–21–21
    20–10–10

The results show clearly that higher grades of $N$–$P_2O_5$–$K_2O$ suspensions with acceptable properties can be prepared by the procedures of my invention; higher grades than those shown had unacceptably high viscosities.

EXAMPLE III

Figure 2:
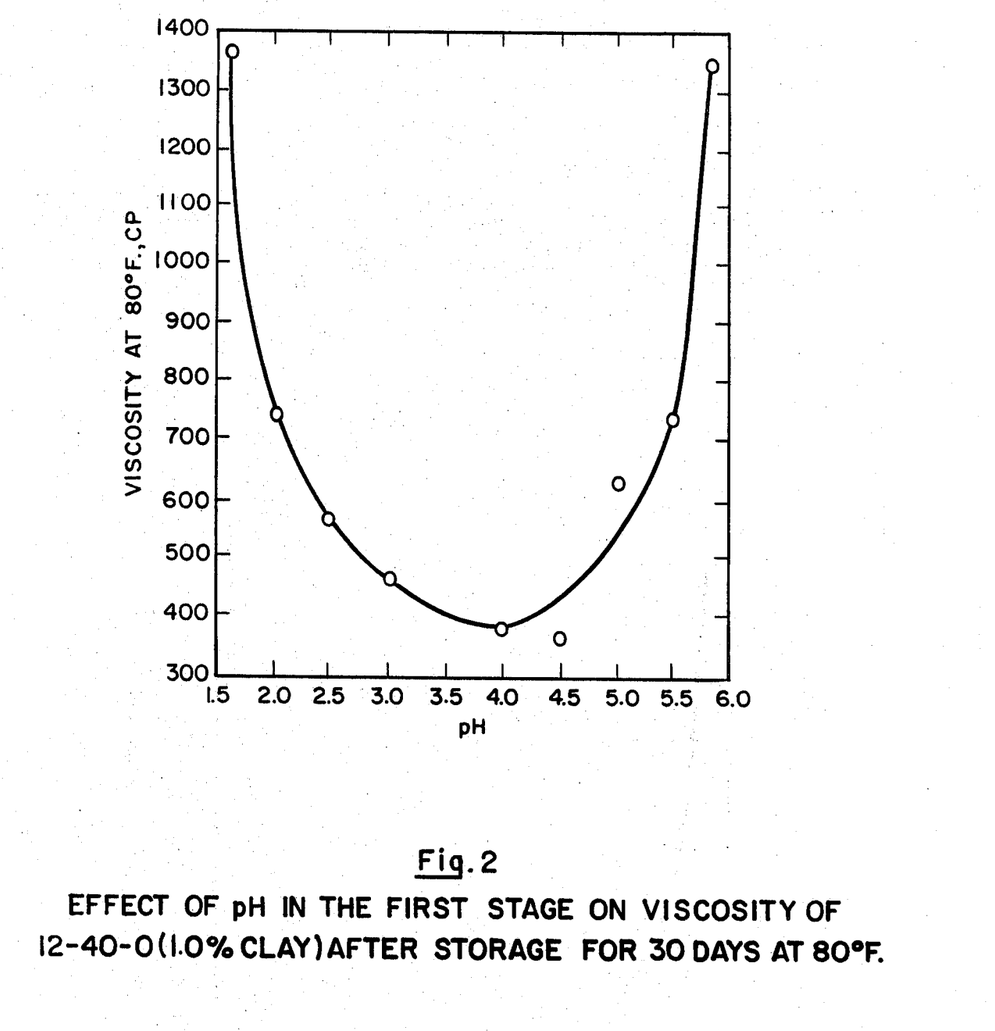
FIG. 2 is a graphical illustration indicating the effect the pH has in the first step or stage of my continuous process on the ultimate viscosity of the end product, in this case a 12-40-0 suspension containing 1 percent clay and stored for 30 days at 80° F.

Referring now more specifically to FIG. 2, the effect of pH in the first stage on viscosity of $N$–$P_2O_5$ suspensions was studied in tests by a continuous, two-stage ammoniation procedure. The temperature in each stage was boiling (about 230° F.); the retention time in the first stage was 30 minutes and in the second stage 10 minutes. The pH in the first stage was varied from about 1.5 to 5.8. The pH in the second stage was held constant at 5.9. The suspensions were stored for 30 days at 100° F. Results from the storage tests show that vicosity of the product decreased rapidly with increase in pH of the first stage up to about 4, then increased sharply with further increase in pH. The data illustrate the necessity for controlling the first-stage pH within certain limits (about 2.0–5.5) and indicate that pH of about 4 is preferred.

EXAMPLE IV

Figure 3:
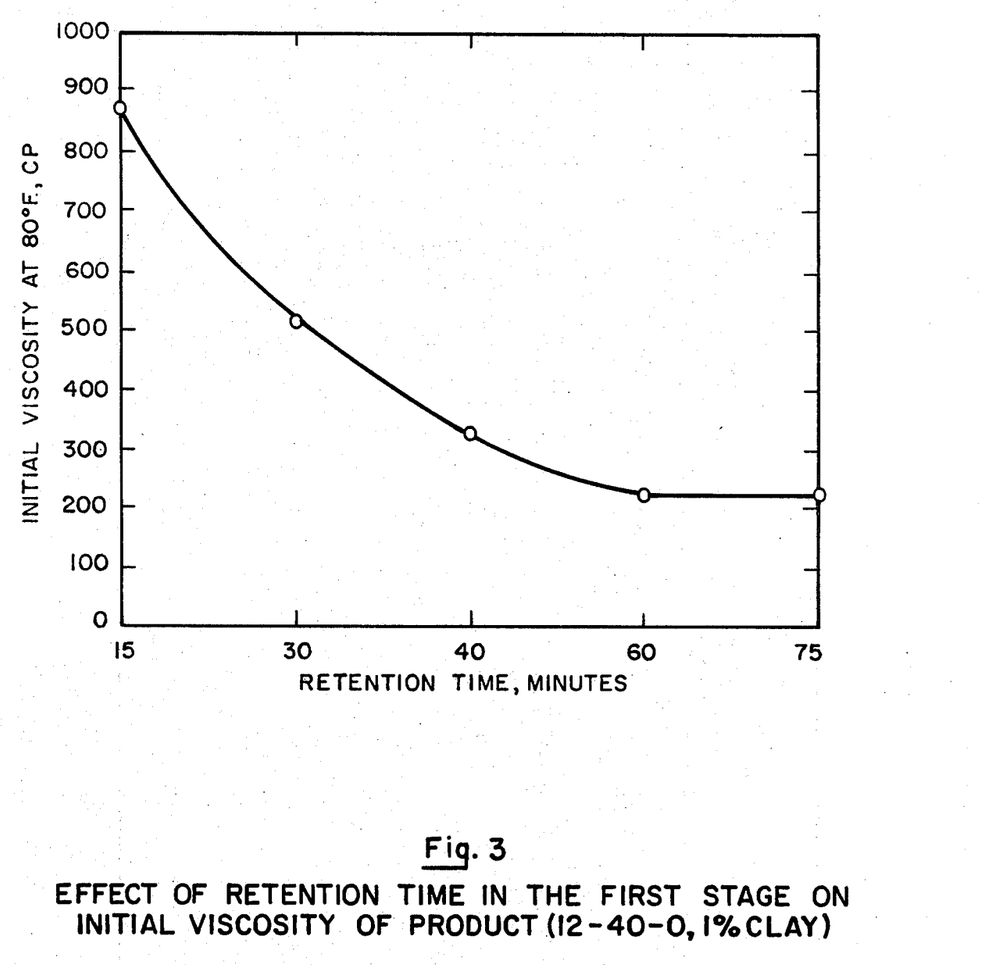
FIG. 3 is a graphical illustration indicating the effect that retention time in the first step or stage reactor in my continuous process has on the ultimate viscosity of the end product, said viscosity measured at 80° F. in centipoises, and said end product to be consistent with FIG. 2, supra, and also being a 12–40–0 suspension containing 1 percent clay.

Referring now more specifically to FIG. 3 there is shown the effects of retention time in the first stage on viscosity of the product suspensions (12–40–0, 1.0 percent clay). The suspensions were prepared by ammoniating wet-process orthophosphoric acid by my two-stage continuous-type procedure. The pH in the first stage was maintained at 4.0 and the pH of the product at 5.9. The temperature in each stage was boiling, and the retention time in the second stage was 10 minutes. Results obtained from the tests show that viscosity decreased with increase in retention time in the firt stage from 15 to 60 minutes. Longer retention time (75 minutes) caused only a small further decrease in viscosity. However, satisfactory operation was obtained with retention times of 15 to 75 minutes. The preferred retention time is about 30 minutes in consideration of both product quality and design of a first-stage vessel as small as possible for the process.

EXAMPLE V

Tests were made to determine the effects of retention time in the second stage on viscosity of the product (about 12–38–0, 1.0 percent clay). The suspensions were prepared as described in Example IV, supra, except the retention time in the first stage was held constant at 30 minutes, and the retention time in the second stage was varied from 5 to 30 minutes. Results obtained from the tests, tabulated below, indicate that retention time in the second stage does not significantly affect the viscosity of the products.

| Second stage retention time, min. | Initial viscosity at 80° F., cp. | Viscosity (80° F.) after storage for 30 days at 100° F., cp. |
|---|---|---|
| 5 | 260 | 245 |
| 10 | 270 | 250 |
| 30 | 300 | 260 |

EXAMPLE VI

Tests were made to determine the effects of temperature in the first stage on viscosity of the products (about 12–40–0, 1 percent clay). The suspensions were prepared by ammoniating wet-process orthophosphoric acid in a continuous two-stage process. In the first stage, the pH was 4.0 and the retention time was 1 hour; the temperature was varied from 160° to 226° F. (boiling). In the second stage, the pH was 5.9, retention time was 10 minutes, and the temperature was 180° F. Results obtained from the tests are tabulated below.

| Grade | Temperature of first stage, ° F. | Initial viscosity at 80° F., cp. |
|---|---|---|
| 12–38–0 | 226 | 280 |
| 12–41–0 | 200 | 960 |
| 13–40–0 | 185 | 630 |
| 13–40–0 | 160 | 800 |

The results indicate that temperature in the first stage has no great effect on viscosity of the product. However, I prefer boiling temperature because (1) most of the heat of reaction is lost through evaporation of water, (2) boiling supplies all of the agitation necessary in this stage, and (3) monoammonium phosphate, which is the stable solid phosphate phase in the first-stage reactor (pH about 4.0), is most soluble at boiling temperature; at lower temperatures, it crystallizes and collects on the sides of the reactor and in the lines from the first to the second reactor. It also thickens the fluid and makes agitation more difficult.

The temperautre allowable in the second stage is governed by ammonia losses, which increase with increase in temperature. I prefer about 160° to 180° F.

EXAMPLE VII

Example VII shows that satisfactory high-grade suspensions with 1 percent clay and pH that varies from 6.4 to 5.4 (tabulated below) may be made by my new procedure.

$N:P_2O_5$ suspensions with final pH in the range 6.4 to 5.4

| Suspension grade | pH | $N:P_2O_5$, wt. ratio | Viscosity at 80° F., cp. | Major crystalline phases |
|---|---|---|---|---|
| 14.1–37.8–0 | 6.4 | 0.37 | 980 | $(NH_4)_2HPO_4$ |
| 13.8–39.3–0 | 6.0 | 0.35 | 630 | $(NH_4)_2HPO_4$ |
| 12.7–41.2–0 | 5.9 | 0.31 | 570 | $(NH_4)_2HPO_4$ |
| 12.4–41.4–0 | 5.8 | 0.30 | 960 | $(NH_4)_2HPO_4$, $NH_4H_2PO_4$ |
| 9.9–38.0–0 | 5.7 | 0.26 | 690 | $NH_4H_2PO_4$ |
| 9.8–43.0–0 | 5.4 | 0.24 | 1.000 | $NH_4H_2PO_4$ |

The results indicate that the $N$—$P_2O_5$ suspensions were satisfactory in all respects. The $N:P_2O_5$ ratios varied from a high of 0.37 (pH 6.4) to 0.24 (pH 5.4). The viscosities of the suspensions were all within the satisfactory limit (<1000 cp. at 80° F.). The major crystalline phase of suspensions with pH 5.9 and above was $(NH_4)_2HPO_4$; below 5.8 it was $NH_4H_2PO_4$. At pH 5.8, both phases were found. Although satisfactory suspensions were prepared over the entire range tested, I prefer $(NH_4)_2HPO_4$ crystals as the major solid phase because the solubility of $(NH_4)_2HPO_4$ does not change as rapidly with temperature as the solubility of $NH_4H_2PO_4$ does. Also, I prefer a pH of about 5.9 because this is about the pH of maximum solubility, which gives the minimum solid content for a given grade.

In a modification of this invention, superphosphoric acid or other sources of polyphosphate or other sequestering agents may be added to products made by my invention to increase the solubility, thus increasing the grade even higher than is obtained by the practice of my invention without the presence of polyphosphates.

EXAMPLE VIII

Data in the following tabulation show that the grade of the product (pH, 5.9) may be regulated at the desired level by monitoring and maintaining the specific gravity of the hot (160° F.) product at a predetermined level.

PRODUCT (pH, 5.9; 160° F.)

| Specific gravity: | Grade |
|---|---|
| 1.495 | 12.3–41.0–0 |
| 1.490 | 12.2–40.5–0 |
| 1.480 | 12.0–40.0–0 |
| 1.470 | 11.9–39.5–0 |
| 1.460 | 11.2–37.5–0 |

With the hot (160° F.) product at pH 5.9, a specific gravity of 1.480 gives the preferred grade, 12–40–0. Specific gravity is used to control product grade because, with 54 percent $P_2O_5$ wet-process acid, dilution water must be added for producing a product with the desired grade, 12–40–0. The amount of dilution water added depends upon the concentration of the acid and upon the losses of water from the system. Since the first stage is maintained at boiling and the second stage at 160° to 180° F. by the heat of reaction, water is lost from the system by evaporation. The amount of water lost depends in part upon atmospheric condition and upon heat losses from the system, the size of equipment used, insulation, etc. Therefore, specific gravity is used to control the proper amount of dilution water added rather than a weight balance approach.

EXAMPLE IX

Nitrogen-phosphate suspensions that were prepared in a single-stage reactor by my batch-simultaneous procedure operated under my preferred conditions are compared with similar suspensions prepared by a normal single-stage procedure for ammoniation of wet-process orthophosphoric acid, e.g., the process set forth in TVA's eighth demonstration booklet dated Oct. 6–7, 1970, page 4. In the first step of my batch-simultaneous procedure, all of the water required for producing the suspension was added to the reactor; then the wet-process orthophosphoric acid was added simultaneously with ammonia to maintain pH 4.0. After all of the acid was added, addition of ammonia was continued to raise the pH to 5.0. The time required was about 45 minutes, and the temperature was boiling (about 230° F.). In the second step, the partially ammoniated acid was cooled to about 200° F. and the remaining portion of the ammonia was added. A pH of 5.9 in the finished product is preferred. The time required for this step was about 15 minutes. Attapulgite clay (1.5%) was then added and thoroughly mixed with the suspensions.

The results in the tabulation below show clearly that suspensions prepared in a single-stage reactor by my two-step batch-simultaneous procedure could be as high in grade as 12–40–0 (1.5% clay) and still be completely satisfactory, whereas suspensions prepared by the normal single-stage procedure could be only as high as grade 10–30–0 and still have satisfactory properties.

Phosphate base suspensions made by ammoniating wet-porcess orthophosphoric acid from Florida ore—comparison of a three-step batch simultaneous procedure with the single-stage process

| Suspension grade [1] | Initial viscosity [2] at 80° F., cp. | After storage for 30 days at 80° F. | |
|---|---|---|---|
| | | Viscosity at 80° F., cp. | Pourability, percent of total volume |
| Batch-simultaneous process of the instant invention: | | | |
| 13–41.0–0 | 1,200 | 1,200 | 0 |
| 12.1–40.0–0 | 840 | 780 | 100 |
| 12.6–39.9–0 | 880 | 660 | 100 |
| Single-stage process of the prior art type: | | | |
| 12–40–0 | 5,900 | >400,000 | 0 |
| 12–36–0 | 1,100 | 7,300 | 0 |
| 10–30–0 | 260 | 220 | 100 |

[1] 1.5% attapulgite clay.
[2] Viscosities at 80° F. of 1,000 cp. or less are considered satisfactory.

EXAMPLE X

The data tabulated below show a comparison of the highest acceptable grade of $N$—$P_2O_5$—$K_2O$ suspensions of various ratios that could be prepared from the orthophosphate base suspensions (12–40–0; see Example 9) prepared by my stepwise batch-simultaneous procedure and from suspensions (10–30–0) prepared by a normal single-stage procedure.

From suspension grade 10–30–0 made by prior art procedure:
 4–12–24
 18–9–9
 12–12–12
 5–5–15

From suspension grade 12–40–0 made by my invention:
 5–15–30
 20–10–10
 14–14–14
 7–21–21

The results show clearly that higher grades of $N$—$P_2O_5$—$K_2O$ suspensions with acceptable properties can be prepared by the procedures of my invention; higher grades than those shown had unacceptably high viscosities.

EXAMPLE XI

The data tabulated below show that high-grade $N$—$P_2O_5$—$K_2O$ suspensions with pH 5.9 or above and properties satisfactory for field application (7 days of satisfactory storage at 80° F.) can be prepared in a single-stage reactor by my new two-step, batch-simultaneous procedure. The production time was 30 minutes. In the first step, the water required for the suspension was added to the reactor; then the wet-process orthophosphoric acid and ammonia were fed simultaneously to maintain pH 4.0. After all of the acid was added, ammonia addition was continued to raise the pH to 5.0. The temperature in this step was boiling. In the second step, potassium chloride and/or nitrogen solution were added. These materials caused the temperature to decrease from boiling (about 230° F.) to about 140° F. or below, and the remaining portion of the ammonia was added for pH about 6.2 to 6.3. Attapulgite clay (1 to 1.5%) was added, and the product was vigorously agitated to disperse the clay and suspend the crystals of fertilizer salts. The suspensions were stored for 1 week at 80° F.

| | | After 7 days at 80° F. | |
|---|---|---|---|
| Suspension grade | Initial[1] viscosity at 80° F., cp. | Viscosity at 80° F., cp. | Pourability, percent of total volume |
| 5-15-30 | 950 | 840 | 100 |
| 13-13-13 | 390 | 500 | 100 |
| 18-9-9 | 400 | 340 | 100 |

[1] Viscosities at 80° F. of 1,000 cp. or less are satisfactory.

EXAMPLE XII

The data tabulated below show that high-grade $N$—$P_2O_5$—$K_2O$ suspensions with pH less than 5.9 and properties (7 days' storage at 80° F.) satisfactory for field application can be prepared in a single-stage reactor by my new two-step, batch-simultaneous procedure. The production time was only about 30 minutes. In the first step, the water required for producing the suspensions was added to the reactor, then the wet-process orthophosphoric acid and ammonia were fed simultaneously to maintain pH of 4.0. The temperature in this first step was boiling. In the second step, nitrogen solution and potassium chloride were added in proportions for the desired N—$P_2O_5$—$K_2O$ ratios. When these materials were added, the temperature decreased from boiling (about 230° F.) to about 140° F. or below. Attapulgite clay (1.0 to 1.5%) was added and the product was agitated vigorously to disperse the clay and suspend the crystals of fertilizer salts. Results from production of the suspension and 7 days of storage at 80° F. are tabulated below.

| | | | After storage for 7 days at 80° F. | |
|---|---|---|---|---|
| Suspension grade | pH | Initial viscosity at 80° F., cp. | Viscosity at 80° F., cp. | Pourability, percent of total volume |
| 14-14-14 | 5.6 | 180 | 160 | 100 |
| 18-9-9 | 5.7 | 100 | 100 | 100 |

EXAMPLE XIII

A suspension fertilizer (N:$P_2O_5$) with grade 12-40-0 (1.5 percent clay) and excellent properties was made by two-stage continuous process (FIG. 1) from wet-process orthophosphoric acid (54 percent $P_2O_5$), gaseous ammonia, attapulgite clay, and water. The pounds of each component required for producing one ton (2000 pounds) of product are shown below:

| | Pounds |
|---|---|
| Wet-process phosphoric acid (54% $P_2O_5$) | 1481 |
| Ammonia (gas) | 291 |
| Water | 597 |
| Attapulgite clay | 30 |
| Total | 2399 |
| Water evaporated | −399 |
| 12-40-0 (1.5% clay) product | 2000 |

During operation of the two-stage, continuous type equipment (FIG. 1), a ton (2000 pounds) of 12-40-0 (1.5 percent clay) product was made by feeding simultaneously 1481 pounds of wet-process phosphoric acid (about 54 percent $P_2O_5$), 597 pounds of water, and 218 pounds of ammonia gas to the first-stage reactor. In this reactor, the temperature was boiling (about 225° F.), the pH (80° F.) was 4.5, and the retention time was 30 minutes. The material from the first stage was fed continuously by gravity flow to the second stage simultaneously with 73 pounds of ammonia. The temperature of the product in the second stage was reduced to 160° F. by evaporative cooling and the retention time was 10 minutes. The product from the second stage and 30 pounds of attapulgite clay were fed to the clay mixing tank and vigorously agitated with a propeller-type stirrer for 15 minutes. During the processing step, heat from the reaction of ammonia and orthophosphoric acid caused the evaporation of 399 pounds of water. The final product, 2000 pounds of 12-40-0 (1.5 percent clay) with pH 5.9 contained crystals of $(NH_4)_2HPO_4$, $(Fe,Al)PO_4 \cdot nH_2O$, and $MgNH_4PO_4 \cdot 6H_2O$. The crystals, all less than 833 microns in size (20 mesh), were suspended in the saturated solutions by the clay. The viscosity of the product at 80° F. was 840 cp.

EXAMPLE XIV

A suspension fertilizer (N:$P_2O_5$:$K_2O$) with grade 18-9-9 (1.0 percent clay) and excellent properties was made by my batch-simultaneous process (FIG. 4) from wet-process orthophosphoric acid (about 54 percent $P_2O_5$), gaseous ammonia, urea-ammonium nitrate solution (32 percent N), water, potassium chloride (98 percent −28 mesh; 62 percent $K_2O$), and attapulgite clay. The pounds of each component required for producing one ton (2000 pounds) of product are shown below:

| | Pounds |
|---|---|
| Wet-process phosphoric acid (54% $P_2O_5$) | 333 |
| Ammonia gas | 49 |
| Water | 377 |
| Urea-ammonium nitrate solution (32% N) | 998 |
| Attapulgite clay | 20 |
| Potassium chloride (98% −28 mesh; 62% $K_2O$) | 290 |
| Total | 2067 |
| Water evaporated | −67 |
| 18-9-9 (1% clay) product | 2000 |

A ton (2000 pounds) of product with grade 18-9-9 (1 percent clay) was made by feeding simultaneously 333 pounds of wet-process acid (about 54 percent $P_2O_5$), 114 pounds of water, and 49 pounds of ammonia (gas) to the reactor (FIG. 4). In the reactor, the temperature was boiling (about 225° F.), and the pH (80° F.) was about 4.5. The remainder of the water (263 pounds), the urea-ammonium nitrate solution (998 pounds), the clay (20 pounds), and the potassium chloride (290 pounds) were fed to the reactor and intimately mixed for about 15 minutes. During the processing steps, heat from the reaction of ammonia with orthophosphoric acid caused the evaporation of 67 pounds of water and the product, 2000 pounds of 18-9-9 (1 percent clay) remained. The final pH of the product was about 5.7 and the viscosity measured at 80° F. was 100 cp. The crystals, $(NH_4)_2HPO_4$, $NH_4H_2PO_4$, $(Fe,Al)PO_4 \cdot NH_2O$, and $MgNH_4PO_4 \cdot 6H_2O$, all —833 microns (20 mesh) were held in suspension with the saturation solution by the clay.

After sifting and winnowing through the data, results, and operations of my new, novel, improved, and unique processes for producing ammonium phosphate ($N:P_2O_5$) and mixed ($N:P_2O_5:K_2O$) suspension fertilizers from wet-process orthophosphoric acids by multistage processes, the preferred and most preferred conditions and variables for carrying out my processes are summarized below in Tables I, II, and III.

TABLE I

Phosphate base ($N-P_2O_5$) suspension made by ammoniating wet-process orthophosphoric acid by continuous two-stage process

| Reaction variables | $N:P_2O_5$ suspension made by a continuous process | |
|---|---|---|
| | First stage | Second stage |
| $P_2O_5$ content of acid, percent by wt.: | | |
| Preferred | 30-72 | |
| Most preferred | 38 | |
| Reaction temperature, °F.: | | |
| Preferred | ¹ 200-230 | 160-180 |
| Most preferred | ¹ 230 | 160 |
| $N:P_2O_5$ ratio: | | |
| Preferred | 0.16-0.26 | 0.28-0.33 |
| Most preferred | 0.21 | 0.30 |
| pH (suspension diluted with $H_2O$ ratio: 1-4): | | |
| Preferred | 2.0-5.5 | 5.8-6.4 |
| Most preferred | 4.0 | 6.25 |
| Retention time, min.: | | |
| Preferred | 15-75 | 5-30 |
| Most preferred | 30 | 10 |
| Specific gravity, at 160° F.: | | |
| Preferred | 1.360-1.480 | 1.440-1.540 |
| Most preferred | 1.460 | 1.500 |

¹ Boiling.

TABLE II

Phosphate base ($N-P_2O_5$) suspension made by ammoniating wet-process orthophosphoric acid, by a stepwise batch-simultaneous process

| | $N:P_2O_5$ suspension made by a batch simultaneous procedure | |
|---|---|---|
| | First step | Second step |
| $P_2O_5$ content of acid, percent by wt.: | | |
| Preferred | 30-72 | |
| Most preferred | 38 | |
| Reaction temperature, °F.: | | |
| Preferred | ¹ 200-230 | ¹ 100-230 |
| Most preferred | ¹ 230 | 160 |
| $N:P_2O_5$ ratio: | | |
| Preferred | 0.16-0.26 | 0.28-0.33 |
| Most preferred | 0.21 | 0.30 |
| pH (suspension diluted with $H_2O$ ratio: 1-4): | | |
| Preferred | 2.0-5.5 | 5.8-6.4 |
| Most preferred | 4.0 | 6.25 |
| Retention time, min.: | | |
| Preferred | 10-20 | 10-20 |
| Most preferred | 15 | 15 |
| Specific gravity, at 160° F.: | | |
| Preferred | 1.360-1.480 | 1.440-1.540 |
| Most preferred | 1.460 | 1.500 |

¹ Boiling.

TABLE III

High-grade $N-P_2O_5-K_2O$ suspensions made from wet-process orthophosphoric acid, ammonia, nitrogen solution, and potassium chloride, in a stepwise batch-simultaneous process

| | High-grade $N-P_2O_5-K_2O$ suspensions made by stepwise process | |
|---|---|---|
| | First step | Second step |
| $P_2O_5$ content of acid, percent by weight: | | |
| Preferred | 25-72 | |
| Most preferred | 38 | |
| Reaction temperature, °F.: | | |
| Preferred | ¹ 200-230 | 70-150 |
| Most preferred | ¹ 230 | 80 |
| pH (suspension diluted with $H_2O$ ratio: 1-4): | | |
| Preferred | 4.0-5.0 | 5.6-6.2 |
| Most preferred | 4.5 | 5.8 |
| Retention time, min.: | | |
| Preferred | 10-30 | 10-30 |
| Most preferred | 15 | 15 |

¹ Boiling.

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by letters patent of the United States is:

1. A process for the production of stable suspension-type fertilizers from wet-process orthophosphoric acid, which suspensions have unusually high plant food contents of upwards to about 14 percent nitrogen by weight and upwards to about 41 percent phosphorus by weight, said phosphorus expressed as $P_2O_5$ and said $P_2O_5$ being present therein as substantially 100 percent orthophosphate and containing the congeneric impurities originally present in said wet-process acid, excellent flow properties within the pourability expressed as percent of total volume is substantially 100 percent, and unusually low viscosities in the range of approximately 500 cp. at 80° F., said pourability and said viscosities effective after storage for up to about 90 days at about 100° F., which process comprises the steps of:

(1) simultaneously adding a stream of ammonia, a stream of water, and a stream of merchant-grade orthophosphoric acid of the wet-process type to a first reactor; controlling the portion of ammonia added relative to said merchant-grade wet-process phosphoric acid in said first reactor to continuously produce a pH therein in the range from about 2.0 to about 5.5;

(2) removing at least a portion of the resulting partially ammoniated merchant-grade wet-process phosphoric acid material from said first reactor and introducing said removed material as a stream into a second reactor; simultaneously introducing into said second reactor together with said stream of material from said first reactor a stream of ammonia; controlling the portion of ammonia added to said second reactor to produce a pH therein in the range from about 5.4 to about 6.5;

(3) subsequently removing at least a portion of the resulting suspension from said second reactor and introducing same into mixing means wherein is added thereto and mixed therewith small amounts of gelling-type clay; and (4) removing from said mixing means the resulting stable suspension characterized by the plant-food content, flow properties, and viscosities set forth supra, and further characterized by the fact that substantially 100 percent of the phosphate values therein are of the ortho type and are derived from wet-process acid.

2. The process of claim 1 wherein the retention time in the first reactor is in the range of about 15 minutes to about 75 minutes and wherein the retention time in the second reactor is in the range of about 5 minutes to about 30 minutes.

3. The process of claim 2 wherein the temperature maintained in the first reactor is in the range from about 160° F. to about 230° F. and wherein the temperature in the second reactor is maintained in the range from about 100° F. to about 230°F.

4. The process of claim 3 wherein the temperature in the first reactor is maintained at about 230° F. and the temperature in the second reactor is maintained at about 160° F. to about 180° F.

5. The process of claim 3 wherein the pH is controlled and maintained in said first reactor at about 4 and the pH in said second reactor is controlled and maintained at about 5.9.

6. The process of claim 3 wherein the amount of water added in relation to the acid and ammonia introduced into said first reactor is controlled in amounts sufficient to maintain a specific gravity in the resulting stable suspension product ultimately removed from said mixing means in the range from about 1.46 to about 1.5, said specific gravity measured in said product at 160° F.

7. The process of claim 6 wherein said specific gravity is maintained at about 1.48.

8. A two-step batch simultaneous process for the production of stable suspension-type fertilizers from wet-process orthophosphoric acid, which suspensions have unusually high plant food contents of upwards to about 14 percent nitrogen by weight and upwards to about 41 percent phosphorus by weight, said phosphorus expressed as $P_2O_5$ and said $P_2O_5$ being present therein as substantially 100 percent orthophosphate and containing the congeneric impurities originally present in said wet-process acid, excellent flow properties within the pourability expressed as percent of total volume is substantially 100 percent, and unusually low viscosities in the range of approximately 500 cp. at 80° F., said pourability and said viscosities effective after storage for up to about 90 days at about 100° F., which process comprises the steps of:

(1) simultaneously adding a stream of ammonia, a stream of water, and a stream of merchant-grade orthophosphoric acid of the wet-process type to a reactor; controlling the portion of ammonia added relative to said merchant-grade wet-process phosphoric acid in said reactor to continuously produce a pH therein in the range from about 2.0 to about 5.5;

(2) subsequently discontinuing the addition of said stream of water and said stream of merchant-grade wet-process phosphoric acid to said reactor and continuing the addition of said stream of ammonia thereto while introducing thereinto predetermined amounts of gelling-type clay;

(3) controlling the portion of additional ammonia added relative to the merchant-grade wet-process phosphoric acid in step (2) supra in said reactor to raise the pH therein up to the range from about 5.8 to about 6.4; and (4) removing from said reactor the resulting suspension characterized by the plant-food content, flow properties, and viscosities set forth supra, and further characterized by the fact that substantially 100 percent of the phosphate values therein are of the ortho type and are derived from wet-process acid.

9. The process of claim 8 wherein the temperature maintained in said reactor during step (1) ranges from about 200° F. to about 230° F. and during step (2) ranges from about 100° F. to about 160° F.

10. The process of claim 9 wherein the retention time in said reactor in step (1) and in step (2) ranges from about 10 to about 20 minutes each.

11. The process of claim 10 wherein the pH in step (1) is maintained at about 4 and the pH to which the material is raised in step (2) is about 6.25.

References Cited

UNITED STATES PATENTS 3,155,490 11/1964 De Lapp ___________ 71—34 X
3,264,087 8/1966 Slack et al. _________ 71—34 X FRANK A. SPEAR, JR., Primary Examiner F. H. LANDER, Assistant Examiner U.S. Cl. X.R.

71—43, 64 C